United States Patent
McIntosh

(10) Patent No.: US 7,493,483 B2
(45) Date of Patent: Feb. 17, 2009

(54) METHOD TO PREVENT VULNERABILITY TO VIRUS AND WORM ATTACKS THROUGH INSTRUCTION REMAPPING

(75) Inventor: Gordon D. McIntosh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 10/782,672

(22) Filed: Feb. 19, 2004

(65) Prior Publication Data

US 2005/0188171 A1    Aug. 25, 2005

(51) Int. Cl.
*H04L 9/00* (2006.01)
(52) U.S. Cl. .............................. 713/2; 713/190; 726/24; 726/25
(58) Field of Classification Search ................. 713/1–2, 713/150, 152, 154, 165, 167, 182, 185, 187, 713/189–190, 193, 10; 709/202; 726/1, 726/2, 6, 13, 19, 22, 27, 30; 380/37, 42, 380/29, 239, 255; 711/204, 206
See application file for complete search history.

(56) References Cited

U.S. PATENT DOCUMENTS

| | | | | |
|---|---|---|---|---|
| 5,684,875 A | * | 11/1997 | Ellenberger | .................... 482/4 |
| 6,298,446 B1 | * | 10/2001 | Schreiber et al. | .............. 726/27 |
| 6,351,796 B1 | * | 2/2002 | McCormick et al. | ........ 711/204 |
| 6,542,981 B1 | * | 4/2003 | Zaidi et al. | ...................... 712/2 |
| 6,970,966 B2 | * | 11/2005 | Gemelli et al. | .............. 710/305 |
| 6,990,685 B1 | * | 1/2006 | Christensen et al. | .......... 726/34 |

OTHER PUBLICATIONS

Vounckx, Johan: Reconfiguration and Fault-tolerant Routing in Massively Parallel; 1996, Belgium.
Govindarajan-S-C, Mehendale-M, & Govindarajan-R: Area and Power Reduction of embedded DSP Systems using Instruction Compression and Re-configuration Encoding; Journal of VLSI Signal Processing Systems for Signal Image and Video Technology; Kluwer Academic Publishers, Netherlands; 2006.
Vogt-T & Wehn-N; A reconfiguration Application Specific Instruction Set Processor for Viterbi and Log-MAP Decoding; 2006 IEEE Workshop on Signal Processing Systmes Design and Implementation; IEEE Psicataway, NJ; 2006.
Quisquater-J-J & Samyde-D: Automatic Code Recognition for Smart Cards Using a Kohenen Neural Network; Usenix Assoc, Berkeley, CA; 2002.

* cited by examiner

*Primary Examiner*—Hosuk Song
*Assistant Examiner*—Leynna T Truvan
(74) *Attorney, Agent, or Firm*—Duke W. Yee; Diana R. Gerhardt; Lisa L. B. Yociss

(57) ABSTRACT

A method for processing instructions by a processing unit. An instruction set is dynamically set for the processing unit using a selected instruction map. The selected instruction map is selected as one being different from a normal instruction map for the processing unit. The instructions are processed at the processor using the instruction set. A set of authorized instructions are encoded using the selected instruction map.

10 Claims, 7 Drawing Sheets

METHOD TO PREVENT VULNERABILITY TO VIRUS AND WORM ATTACKS THROUGH INSTRUCTION REMAPPING

BACKGROUND OF THE INVENTION

1. Technical Field

The present invention relates generally to an improved data processing system and in particular to a method and apparatus for executing instructions in a data processing system. Still more particularly, the present invention relates to a method, apparatus, and computer instructions for processing instructions in a manner to prevent vulnerability to virus and worm attacks.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

With this increased connectivity through the Internet, computer systems are experiencing an increasing number of attacks by individuals using increasingly sophisticated methods of attack. As the number of systems connected to insecure networks, both intranet and Internet, the potential for damage increases. The increasing dependence on a single operating system (Microsoft Windows), and a single processor architecture (Intel) for the vast majority of systems has exacerbated this problem and made worldwide attacks possible to infect very large numbers of computer systems.

The currently available solutions include, for example, virus detection software, firewalls, government initiatives, security policies, and evaluation systems. Virus detection software are programs or code that scan data input through network connections and file systems for some 64000+ known viruses, as well as, applying rules based tools to scan for "virus like" programs. Firewalls are used to block network access from sources not specifically allowed.

Extensive initiatives from US Government agencies, such as NSA, NIAP, NIST, and FIPS, are being implemented. NSTISSP No. 11 is a security policy governing acquisition of IT products by the US Government. Further, International community support is present for the Common Criteria (CC) Evaluation of IT systems.

Starting in the early 1980s the US government established initiatives targeted at increasing the security level of computer systems. Early efforts most widely known as the "Orange Book" started with the NSA's "Rainbow Series" were evaluated by other governments and an initiative known as the Common Criteria emerged to develop a set of "common" security standards that would be recognized by governments of member nations. This effort is currently receiving rapidly increasing support from the predominately Western member nations and membership has increased from 7 nations to 13 nations with additional interest being shown by Japan, China, Korea and other Asian nations.

The standard known as the Common Criteria v1.0 was initially released in 1996, is currently at v2.1 (2001), and has widespread acceptance, as well as, ISO recognition. This standard provides comprehensive discussions of security using a hierarchical framework of security concepts and terminology with viewpoints from consumers, developers, and evaluators/certifiers. The standard outlines extensive security methology start in design and follow through to deployment. This standard is a rapidly evolving standard, reacting to the changing demands of international security. An interim update to v2.2 is due in 2003 and a major rewrite of the standard (v3.0) is planned for 2005.

The most influential event in the acceptance of security standards was Directive NSTISSP no. 11 from the chairman of the NSTISSP. In February 2000, it was directed that all IT systems acquired after 1 Jul. 2002 that need information Assurance (IA) be certified by the Common Criteria or the FIPS Cryptomodule Validation Program. This has resulted in many companies selling IT equipment to the US government to start certification programs. Additionally Presidential Decision Directive on Critical Infrastructure Protection (PDD-63) encourages CC certification for the operation of any IT system associated with the operation of critical infrastructures.

These current solutions all have drawbacks. For example, virus detection programs are effective only against known viruses. New viruses are largely undetected as the rules based techniques are almost completely ineffective. The detection of a virus is therefore done after the fact. In this situation, the attack is already underway, prior to the detection and usually has done damage already.

The companies selling virus protection are required to detect a new virus or variant of an old virus, assess the damage potential, develop compatible detection algorithms, notify users, and make updates to the virus protection. This procedure is a time consuming process and can take from a few hours to a week to accomplish.

Users of the virus protection must connect to the Internet to download the new virus protection thereby exposing their computer to attack. The protection must be downloaded, the virus protection program updated, and the system scanned for viruses. The process of scanning the computer can take as much as several hours, further limiting productivity of the work force. Even users of computers not infected can have appreciable loss of use to their computer system. Users of infected systems can suffer loss from a few hours to a few weeks.

Firewalls contain a weakness because they depend on blocking network traffic using IP addresses to perform selection of trusted sources. Attacks delivered through trusted sources such as email and files downloaded via browsers are not affected by firewall protection. Firewalls are also ineffective in preventing attackers scanning for vulnerability such as network ports left open by poor programming practices.

With respect to initiatives, acquisition policies and Common Criteria, these programs contain vulnerabilities. For example, although the widespread acceptance of the Common Criteria was greatly encouraged by NSTISSP no. 11, the cost of the process is very substantial and time consuming. The standard is still evolving and specialized expertise is required to accomplish certification. The results are still relatively unproven and recent attack successes have shown weaknesses in the model, especially the vulnerability analysis. The process of obtaining certification may last from 6 months for low assurance levels to more than 3 years for high assurance levels.

It is well recognized that vulnerability analysis of computer systems striving to prevent attacks can only give a level of assurance that attacks will not succeed. This analysis depends heavily on the concepts of attack potential vs. the strength of security function that has been designed into the system. These measures are passive methods that are in their infancy of definition and are subjective at best, resulting in a security methodology that has been ineffective as recent successful worldwide attacks have proven.

Therefore, it would be advantageous to have an improved method, apparatus, and computer instructions for preventing vulnerability to virus and worm attacks.

SUMMARY OF THE INVENTION

The present invention provides a method for processing instructions by a processing unit. An instruction set is dynamically set for the processing unit using a selected instruction map. The selected instruction map is selected as one being different from a normal instruction map for the processing unit. The instructions are processed at the processor using the instruction set. A set of authorized instructions are encoded using the selected instruction map.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
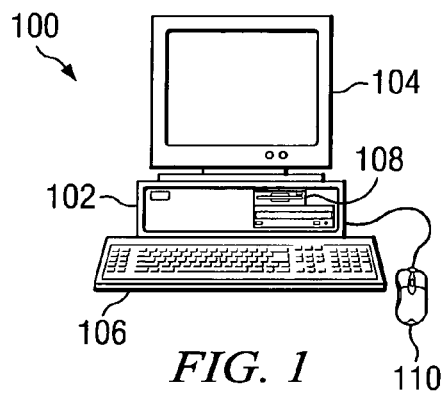
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or Intellistation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
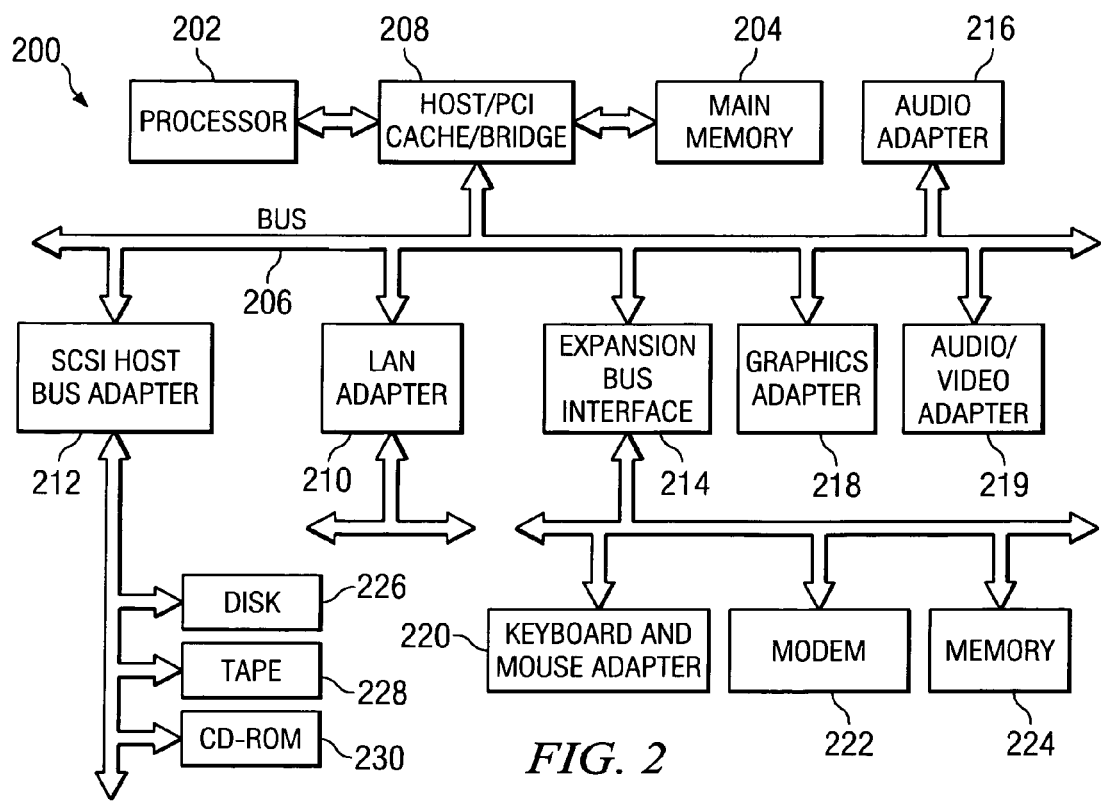
FIG. 2 is a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention recognizes that the ability of a virus or worm to launch an attack is dependent on the operating system and instruction architecture. By changing either of these components, the attack methodology is compromised. Because the predominant dependency of these attacks is on the processor instruction architecture, such as data processing systems using non-Intel architectures are invulnerable to attacks launched against an Intel architecture, the present invention exploits this vulnerability in the attack methodology used by viruses and worms.

The mechanism of the present invention is targeted specifically against attacks that depend on infecting a target data processing system with an executable program through various vulnerability in either firmware, operating system software, or application layer software programs. These attacks include, for example, worms, viruses, data section Trojan Horses, self modifying code, and attack variants that require execution of a program from non-trusted sources.

In particular, the mechanism of the present invention exploits vulnerability in attack methods used by viruses used to load programs into the memory of the data processing system by making the opcode in processor instructions programmable. In this manner, an encryption process may be used on data processing systems to assign opcodes to the instructions making these instructions individually machine dependant and unknown to an attacking program.

In the mechanism of the present invention, processor instruction decode units are made programmable. For example, at reset time an instruction map is loaded into the instruction decoders. This instruction map also is referred to as an instruction decode map or an opcode map. This map maintained by the trusted computing base, which also maintains the program loader as the loader must modify all non-default instructions necessary prior to loading into the execution pipeline for the processor. A trusted computing base is the part of the data processing system that contains programs, code, or instructions that are "trusted" by the user. A program loader as used herein is a program or process that is used to load instructions for a program. A program loader is typically part of an operating system. With the mechanism of the present invention, only instructions that were previously encoded with the correct opcode will produce meaningful executable instructions, all others will be invalid or produce illegal instruction exceptions.

In effect this methodology changes the instruction architecture of every machine it is deployed upon, and by using the appropriate encryption algorithm to alter the instructions, can secure the processor and make the attacks outlined impossible. The strength of this security function can be varied to match the attack potential and price targets for systems ranging from embedded controllers, PCs, large servers, mainframe systems, or any system deemed potentially vulnerable to attack by those methods listed above.

The addition of programmable decoding requires a relatively small modification to existing architectures and results in a small load time overhead but no additional runtime overhead. It is envisioned that the additional circuitry will be a negligible cost impact.

Figure 3:
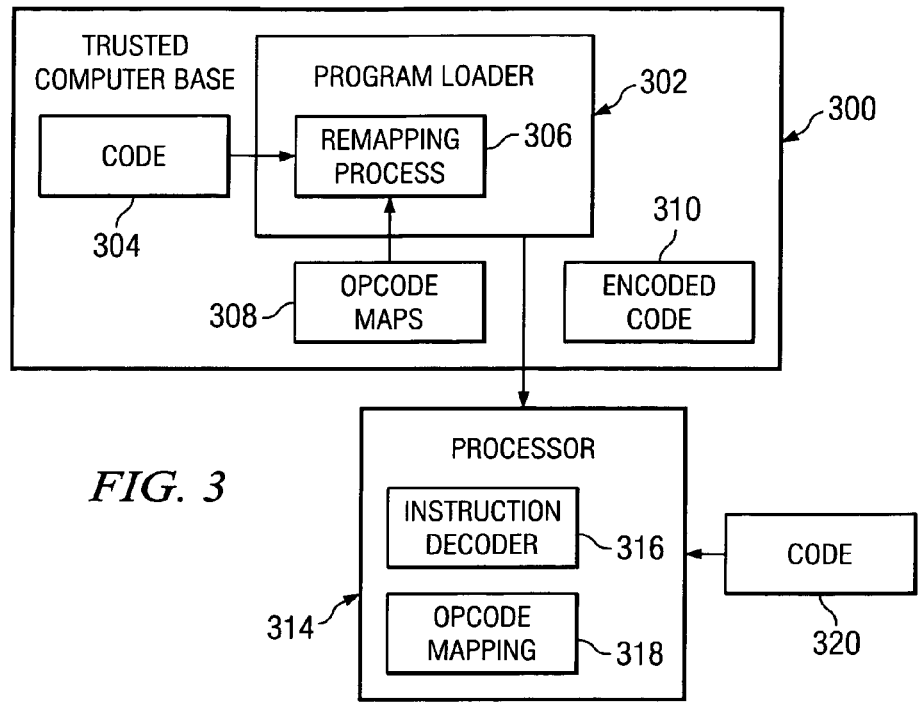
FIG. 3 is a diagram illustrating components used in preventing vulnerability to virus and worm attacks through instruction remapping in accordance with a preferred embodiment of the present invention.

With reference now to FIG. 3, a diagram illustrating components used in preventing vulnerability to virus and worm attacks through instruction remapping is depicted in accordance with a preferred embodiment of the present invention. As illustrated, trusted computer base 300 includes program loader 302, which processes code 304 when a user selects code 304 for execution. Trusted computer base 300 is a portion of the data processing system that is trusted to be free of malicious code, such as, viruses or worms.

When code 304 is selected for execution, remapping process 306 in program loader 302 remaps the opcodes in code 304 using an instruction, such as an opcode map selected from opcode maps 308. Opcode maps 308 contains a number of different opcode mappings that may be used to remap code 304. The remapping of code 304 results in the generation of encoded code 310, which is sent to processor 314 for execution.

Encoded code 310 is decoded by instruction decoder 316 using an instruction set based on an instruction map, such as opcode mapping 318. In these illustrative examples, opcode mapping 318 is an opcode map that is identical to the opcode map selected from opcode maps 308 for use by remapping process 306 to remap code 304 into encoded code 310. As a result, encoded code 310 may be executed by processor 314.

On the other hand, if malicious code, such as code 320 is introduced into the data processing system, this code will not be properly executed by processor 314. Code 320 is directed toward a default or standard instruction set used for processor 314, instead of the selected instruction set in opcode mapping 318. Opcode mapping 318 may be implemented using a set of registers to hold one or more opcode maps. For example, if a supervisor mode and a user mode is present, a different opcode map may be used for each privilege level. These registers are also referred to as decode map registers (DMRs). In this case, when instruction decoder 316 decodes instructions in code 320, errors will be generated resulting from an attempt to execute invalid instructions. Further, the generation of these errors may be used to detect the presence of unauthorized code in the data processing system.

In the illustrative examples, a data processing system, such as data processing system 200 in FIG. 2, includes an instruction encryption algorithm with a minimum of $2^{32}$ unique combinations of primary opcode maps, as well as, a default opcode map that corresponds to the published map. In these examples, these opcode maps may be found in opcode maps 308. This feature stops the exponential propagation of virus and worm attacks even in the event of the weakest encryption an algorithm compromise by an attacker, the probability of a successful attack approaches zero because each attack must find the one machine in $2^{32}$ that is vulnerable to attack. Of course, other numbers of opcode maps may be used depending on the implementation.

In remapping process 306, an encryption algorithm changes the decode instruction map each time data processing system is rebooted or initialized. This feature increases the necessary attack potential to exploit the invention through agile techniques, such as, a target of evaluation that is constantly changing. Of course, the changing of the instruction map may change based on other events, such as a particular user input based on some periodic event, like the expiration of a timer.

In the illustrative examples, encoding is performed at program load time to code section. As a result, encoded binary files are not necessary. This feature enables the feature of changing the decode instruction map by removing any necessity to save encrypted code and increases the necessary attack potential by increasing the specialized knowledge required to access the algorithm (dynamic in memory vs. static in file system) to attempt to compromise an algorithm. This feature allows extremely flexible operation, including allowing the possibility of encryption on a per process basis.

With the mechanism of the present invention, modification to existing programs is limited to the program loader. Minimizing the changes required to a given system minimizes the cost of implementation. Further, encryption algorithms are accessible only by the trusted computing base. This feature prevents non-trusted programs from being encrypt.

In the illustrative examples, the mechanism of the present invention requires the instruction decoders be programmable, allowing the primary opcodes be programmed either at reset, or dynamically during runtime, or both. The primary opcodes in the default map are replaced by those in the programmable instruction map. Primary opcodes for different privilege levels, such as user, supervisor, and hypervisor privilege levels, may be programmed individually. In other words, different instruction maps may be used for different users or processes. As a result, if one user or process is compromised, the other users or processes may remain invulnerable to these attacks.

With programming different instruction maps for different users or processors, a design tradeoff occurs to determine how many opcodes are changed from the default map. The opcodes differing from default are changed at load time by the trusted loader. It is possible that only critical opcodes for the user privilege level are different from the published opcodes. These include, for example, load, store, and change of state instructions. Similarly it is possible that only selected opcodes are changed into supervisor privilege opcode map but it is a key part of this invention that critical opcodes are different between the user, supervisor, and hypervisor privilege levels.

This feature makes it impossible for a rogue program to change state from user to supervisor, and continue executing user privilege code in supervisor privilege. In systems with a hypervisor privilege level, it is a key part of this invention that the entire primary hypervisor primary opcode map be different from the default map. Thus, any change of state into the hypervisor level results in an immediate error. In these examples, a hypervisor privilege level is one present in logical partitioned data processing systems in which such a level allows a user control of the logical partitioned data processing system, such as, to make adjustments in the partitioning of resources.

If a single decode map is used for all privilege levels only a single decode map register (DMR) is necessary. If user and supervisor level privilege encryption/decryption is desired two DMRs are required, $DMR_{user}$ and $DMR_{Supervisor}$. Advanced processor architectures with more than two privilege levels (as is necessary to support multiple simultaneous operating system operation) require an additional register, $DMR_{Hypervisor}$, be available to the highest privilege (Hypervisor) level. The processor change of state operation causes the automatic switch between DMRs. Additionally, the use of Simultaneous MultiThreading (SMT) requires a set of Decoding Registers for each thread supported.

This instruction decoding may be designed to either permanently enabled in systems requiring high strength of function, or be programmable to enabled/disabled with respect to the processor privilege level in systems not requiring as high strength of function. Additionally, the decryption unit can be designed using the length of encryption necessary to achieve the strength of the function desired, such as, for extreme low price point systems a 64 bit encryption may be use, for very high strength of function a 2048 bit (or longer) encryption may be used.

In these illustrative examples, the instruction stream is required to be encrypted prior to instruction fetch. The encryption of the instruction stream may be limited by processor privilege level or may apply to all levels depending on the strength of function desired.

Figure 4A:
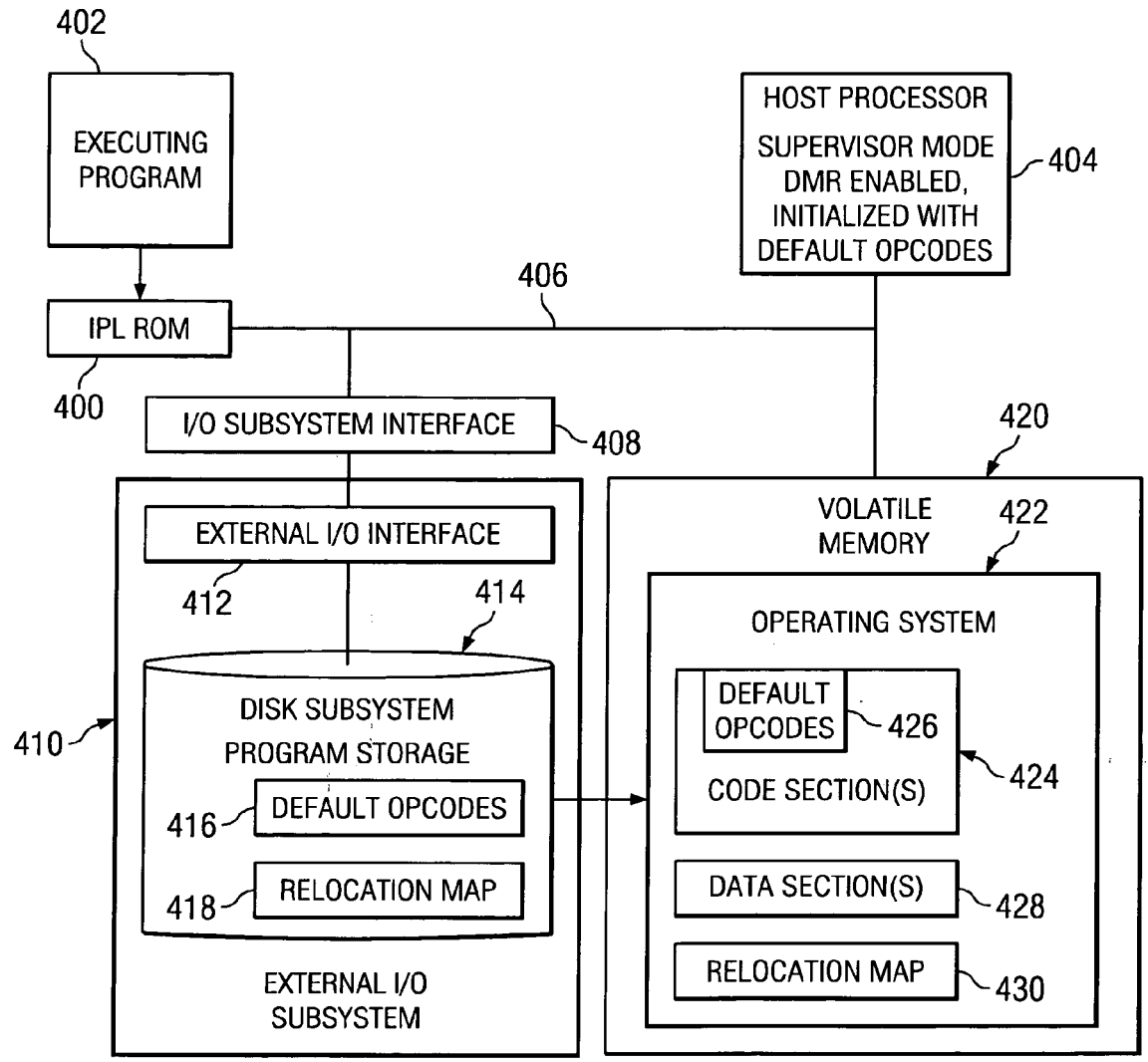
FIGS. 4A and 4B are an initial program load sequence in accordance with a preferred embodiment of the present invention.

Turning now to FIGS. 4A-7, diagrams illustrating a dual privilege level operation are depicted in accordance with an illustrative embodiment of the present invention. With reference first to FIGS. 4A and 4B, an initial program load sequence is depicted in accordance with a preferred embodiment of the present invention. In FIG. 4A, initial program load (IPL) read-only memory (ROM) 400 contains instructions for an initial program load. In this illustrative embodiment, executing program 402 is the IPL program, which is executed by host processor 404. This IPL occurs when the data processing system is reset or started. Host processor 404 executes in a supervisor mode when the reset occurs. Additionally, host processor 404 is decode map register (DMR) enabled and the DMR is initialized with default opcodes. The default opcodes are used to run executing program 402. By being DMR enabled, host processor 404 is able to load and use different opcode maps, such as opcode mapping 318 in FIG. 3. With a dual privilege level, host processor 404 supports two opcode maps, one for each privilege level.

As illustrated, IPL ROM 400 and host processor 404 are interconnected by bus 406. Additionally, I/O subsystem interface 408 is connected to bus 406 and provides a connection for external I/O subsystem 410. This subsystem contains external I/O interface 412 and disk subsystem 414. Default opcodes 416 and relocation map 418 are stored within disk subsystem 414. During initial program load, volatile memory 420 is the location in which operating system 422 is loaded.

Additionally, code section(s) 424 is loaded as part of operating system 422 and contains default opcodes 426. Default opcodes 426 are used in initializing operating system 422. Executing program 402 is executed by host processor 404 using default opcodes. Executing program 402 executes without error because host processor 404 uses default opcodes in the DMR and default opcodes 426 are present for executing program 402 in volatile memory 420.

Further, data section(s) 428 and relocation map 430 are also loaded as part of operating system 422. Data section(s) 428 contains initial data used by operating system 422. Relocation map 430 is typically used to identify locations that use a dynamic linked library routine located in memory. At load time, the link/loader writes the actual address of the routine called into code section(s) 424 located by relocation map 430. This function is expanded in the illustrative examples to include a table of pointers to each instruction that is to be remapped. In this manner, this particular illustrative implementation, avoids having to search code section(s) 424. The process used to rewrite opcodes may look up the address by instruction type and rewrite opcode for that instruction. In this manner, the majority of the processing may be completed at compile time with the information for remapping instruction codes being carried in the object module. In other words, this map points to opcodes, such as those in default opcodes 426 that are to be remapped.

Figure 4B:
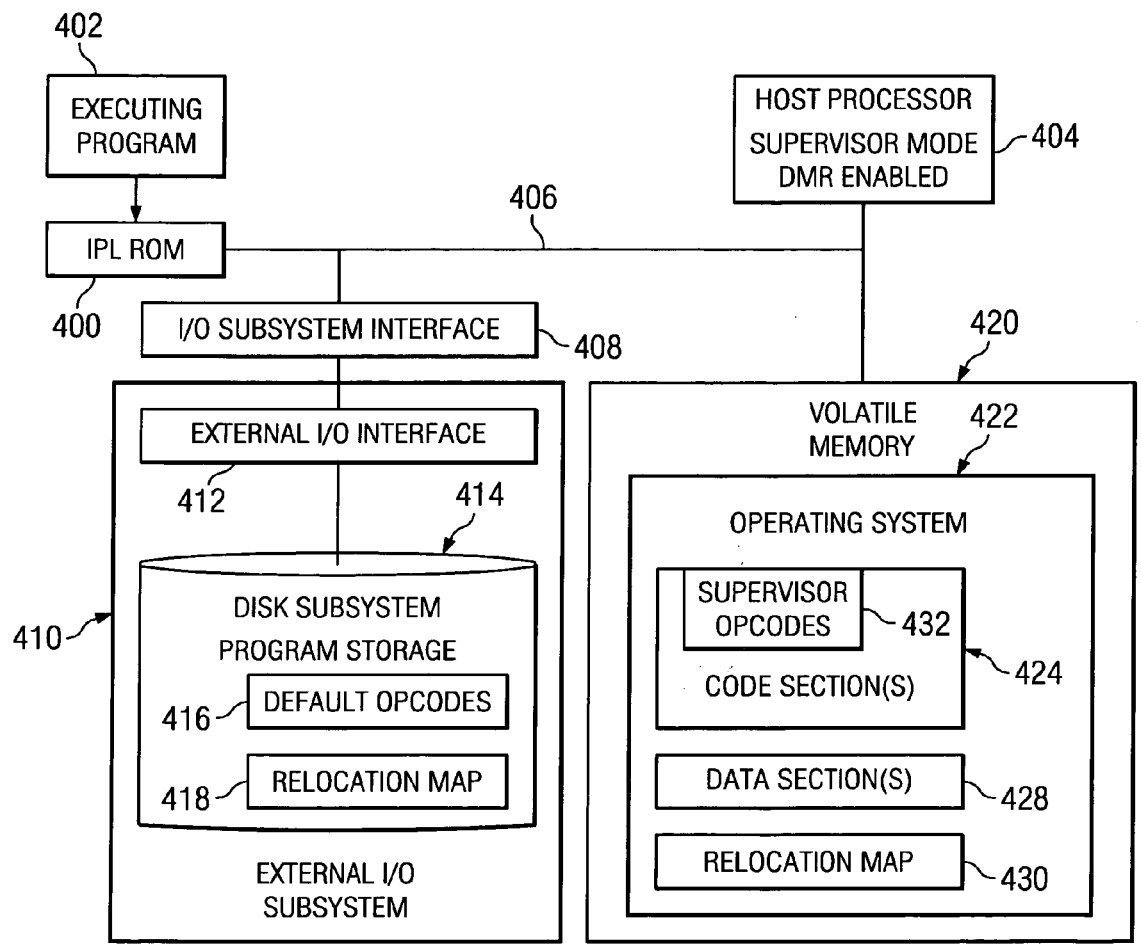

In FIG. 4B, code section(s) 424 now contains supervisor opcodes 432. These opcodes are present in response to remapping of opcodes for a supervisor mode or privilege level. Additionally, host processor 404 is now DMR enabled in a supervisor mode. In other words, the opcode map used by host processor 404 is one set by a supervisor mode. The IPL program, executing program 402, exits as soon as the remapping is completed and the DMR in host processor 404 is reprogrammed with the desired opcode map.

After the opcodes have been remapped in code section(s) 424 to form supervisor opcodes 432, operating system 422 begins executing in a supervisor mode with a supervisor opcode map being enabled as shown by supervisor opcodes 432 in code section(s) 424. The remapping of opcodes does not require remapping of all of the opcodes in the opcode map. The number of opcodes and the particular opcodes that are remapped depend on the particular implementation.

Figure 5:
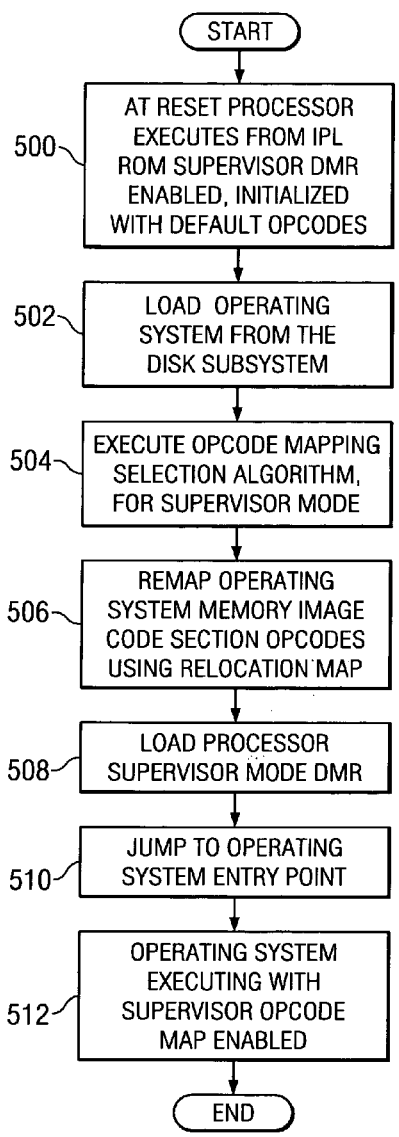
FIG. 5 is a flowchart of a process for an initial program load in accordance with a preferred embodiment of the present invention.

Turning next to FIG. 5, a flowchart of a process for an initial program load is depicted in accordance with a preferred embodiment of the present invention. The steps illustrated in FIG. 5 illustrate steps that occur in FIGS. 4A and 4B in initializing operating system 422.

The process begins by, at reset, the host processor executing code from the IPL ROM with the host processor being supervisor DMR enabled and initialized with default opcodes (step 500). The operating system is loaded from the disk subsystem (step 502). Next, the opcode mapping selection algorithm is executed for supervisor mode (step 504). Then, the operating system memory image code section opcodes is remapped using a relocation map (step 506). These opcodes are those located in code section(s) 424 in FIG. 4B. Then, the processor supervisor mode DMR is loaded (step 508). Step 508 loads opcodes specifically for the supervisor mode into the host processor.

Next, the process jumps to operating system entry point (step 510). This step is used to pass control to the operating system. The operating system then executes with the supervisor opcode map enabled (step 512). The process terminates thereafter.

Figure 6A:
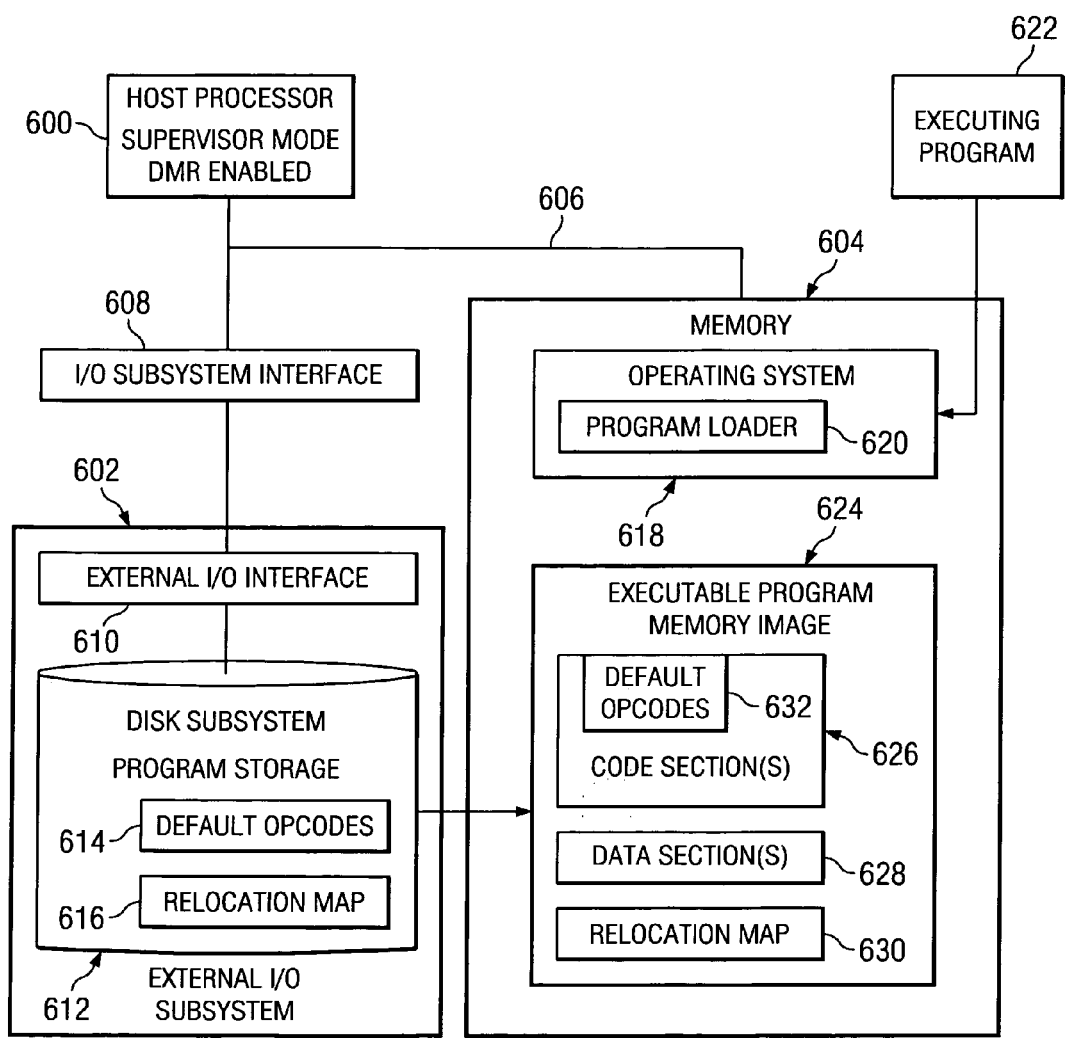
FIGS. 6A and 6B are diagrams illustrating user program operations in accordance with a preferred embodiment of the present invention.
Figure 6B:
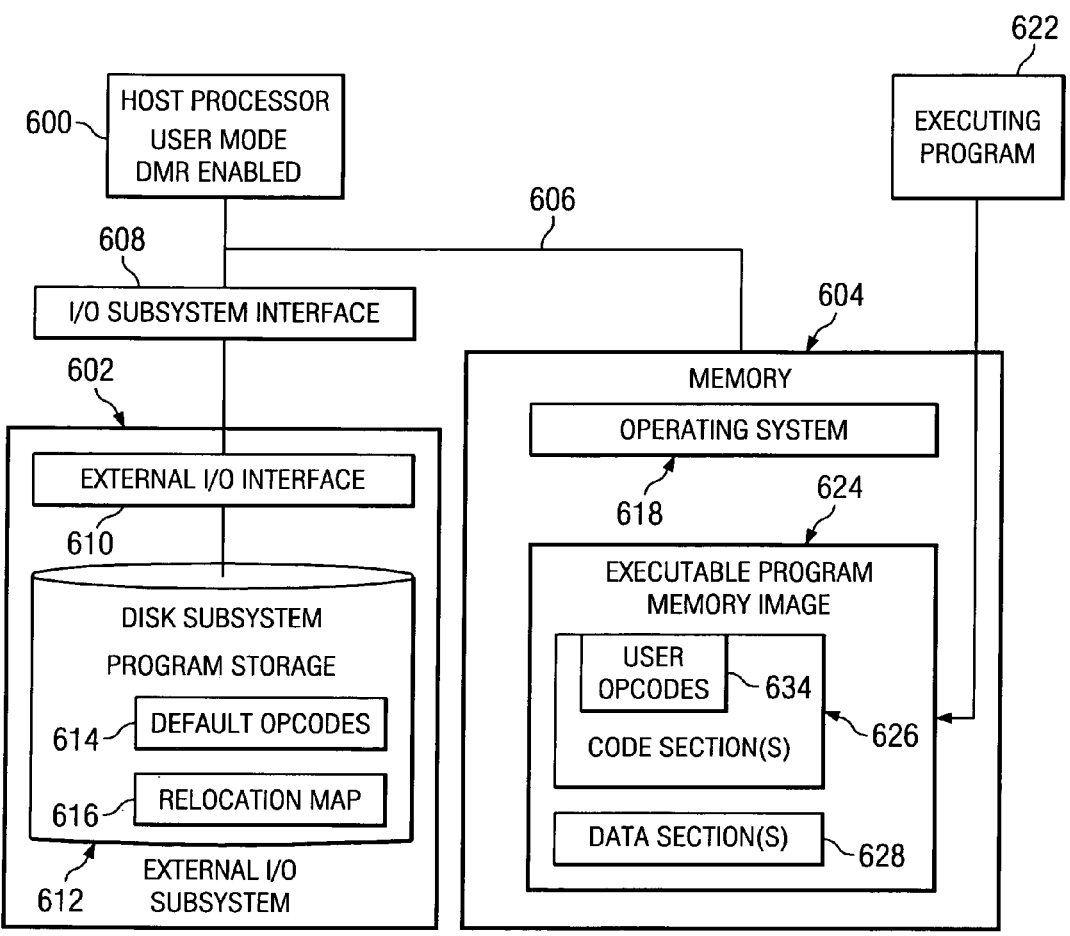

With reference now to FIGS. 6A and 6B diagrams illustrating user program operations are depicted in accordance with a preferred embodiment of the present invention. In FIG. 6A, host processor 600 is in a supervisor mode with DMR enabled. This processor and other components such as external I/O system 602 and memory 604 are connected to bus 606. External I/O subsystem is connected to bus 606 through I/O subsystem interface 608. This subsystem includes external I/O interface 610 and disk subsystem 612. Disk subsystem 612 provides storage for code such as default opcodes 614 and relocation map 616. Relocation map 616 describes changes to default opcodes 614. This map may describe changes for different user levels as well as provide a selection process for identifying opcodes that should be changed.

Memory 604 contains operating system 618. Program loader 620 is part of operating system 618 and is used to load code such as that for executing program 622. This program is loaded into executable program memory image 624. As illustrated, executable program memory image 624 includes code section(s) 626, data section(s) 628, and relocation map 630. Code section(s) 626 contains code for executing program 622 using default opcodes 632. Program loader 620 remaps default opcodes 632 using relocation map 630. By remapping these opcodes, user opcodes 634 are used for executing program 622 in FIG. 6B. Additionally, host processor 600 has its DMR loaded with a user mode opcode map. In this manner, when opcodes from user opcodes 634 are presented to host processor 600 for execution, host processor 600 executes those opcodes without errors.

Figure 7:
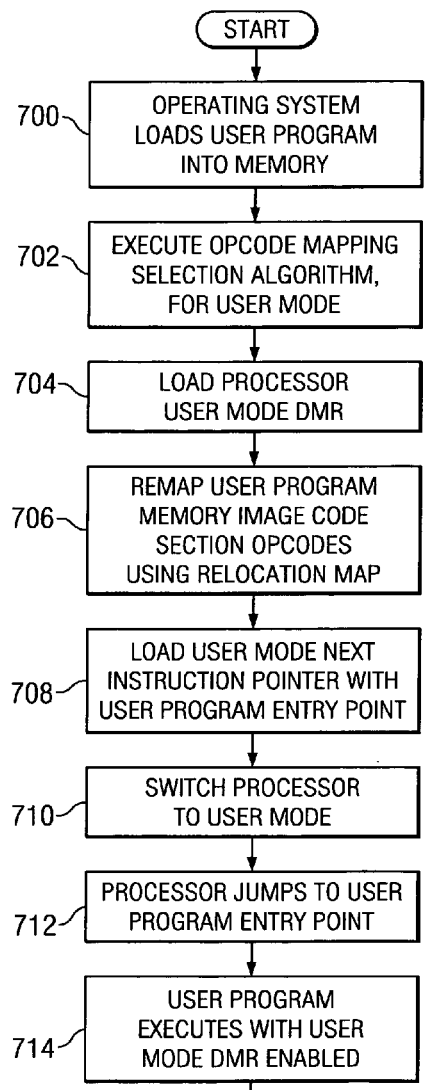
FIG. 7 is a flowchart of a process for loading and executing a user program in accordance with a preferred embodiment of the present invention.

Turning now to FIG. 7, a flowchart of a process for loading and executing a user program is depicted in accordance with a preferred embodiment of the present invention. The process illustrated in FIG. 7 shows steps in executing a program in a user mode or privileged level.

The process begins by the operating system loading a user program into memory (step 700). In step 700, the memory is memory 604 in FIG. 6A. Specifically, the user program is loaded into code section(s) 626 in executable program memory image 624 in FIG. 6A. An opcode mapping selection algorithm is executed for the user mode (step 702). The processor user mode DMR is loaded (step 704). In step 704, an opcode map for the user mode is loaded into the DMR.

Next, the user program memory image code section opcodes are remapped using a relocation map (step 706). Step 706 remaps the user program using the opcodes for the user mode. The user mode next instruction pointer is loaded with the user program entry point (step 708). This step is used to allow the program to execute. Next, the processor is switched to the user mode (step 710). The processor then jumps to user program entry point (step 712), and the user program executes with user mode DMR enabled (step 714) with the process terminating thereafter.

Figure 8:
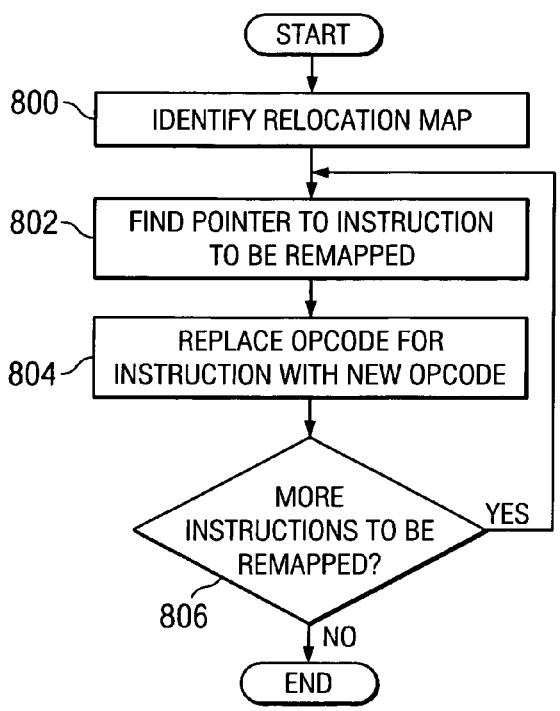
FIG. 8 is a flowchart of a process for remapping opcodes in accordance with a preferred embodiment of the present invention.

With reference now to FIG. 8, a flowchart of a process for remapping opcodes is depicted in accordance with a preferred embodiment of the present invention. The process illustrated in FIG. 8 may be implemented in a remapping process in a program loader, such as remapping process 306 in FIG. 3.

The process begins by a relocation map being identified (step 800). In these examples, the relocation map is used to identify locations of instructions in memory that will be remapped with new opcodes. These pointers are found in a table in the relocation map. Next, a pointer to instruction to be remapped is found (step 802). Then, the opcode for the instruction is replaced with a new opcode (step 804). Next, a determination is made as to whether more instructions are being remapped (step 806). If more instructions are not going to be remapped, the process terminates thereafter. However, if more instructions are going to be remapped, then the process proceeds to step 802 as described above.

This remapping process may be preformed in different ways depending on the particular implementation. For example, the process may search the code for selected instruction types and replace opcodes for those instructions falling within the selected instruction types with new opcodes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for modifying instructions using a processing unit that has a standard instruction set, the method comprising:

using, by an encryption algorithm each time the computer system is rebooted, a different one of a plurality of different instruction maps to dynamically remap the standard instruction set to create a new instruction set;

programming a decode unit to decode code using a selected one of the plurality of different instruction maps that was selected in response to a particular reboot of the computer system, wherein a particular new instruction set was created using the selected one of the plurality of different instruction maps;

receiving a selection of particular code to be executed by a processor that includes the decode unit;

determining whether or not the particular code is trusted code, wherein code is trusted only when the code resides in an area of the computer system that is trusted to be free of malicious code, and further wherein the area includes a program loader and the plurality of different instruction maps;

in response to determining that the particular code is trusted code: using, by a remapping process in the program loader, the selected one of the plurality of different instruction maps to remap each opcode in the trusted code to new opcode using the particular new instruction set to produce encoded code, wherein the decode unit can decode the encoded code;

in response to determining that the particular code is not trusted code, leaving each opcode in the particular code unchanged, wherein the decode unit cannot decode the particular code; and processing, by the processor that is included in the processing unit, only those instructions that use the particular new instruction set.

2. The method of claim 1, further comprising:

performing the dynamic remapping during execution of an initial program load (IPL) process and before the computer system begins executing an operating system.

3. The method of claim 1, wherein each one of the plurality of different instruction maps is an opcode map.

4. The method of claim 1 further comprising:

encoding a set of instructions from a trusted computer base using the one of the plurality of different instruction maps to form a set of encoded instructions; and sending the set of encoded instructions to the processing unit for execution.

5. The method of claim 4, wherein the encoding step and the sending step are performed by a program loader.

6. The method of claim 1 further comprising:

responsive to an event, executing a process to select the one of the plurality of different instruction maps.

7. The method of claim 6, wherein the process uses a machine serial number and a number of boot cycles to select the one of the plurality of different instruction maps.

8. The method of claim 6, wherein the event is at least one of an initialization of the computer system and a user input.

9. The method of claim 1, wherein the new instruction set is created using a first one of the plurality of different instruction maps when code is executed by a first privilege level and wherein a second one of the plurality of different instruction maps is used when code is executed by a second privilege level.

10. A method in a computer system for modifying instructions using a processing unit that has a standard instruction set, the method comprising:

using, by an encryption algorithm each time the computer system is rebooted, a different one of a plurality of different instruction maps to dynamically remap the standard instruction set to create a new instruction set;

determining whether or not particular code is trusted code, wherein code is trusted only when the code resides in an area of the computer system that is trusted to be free of malicious code, and further wherein the area includes a program loader and the plurality of different instruction maps;

in response to determining that the particular code is trusted code: using, by a remapping process in the program loader, the selected one of the plurality of different instruction maps to remap each opcode in the trusted code to new opcode using the particular new instruction set to produce encoded code; and in response to determining that the particular code is not trusted code, leaving each opcode in the particular code unchanged.

* * * * *